United States Patent [19]
DeRees et al.

[11] Patent Number: 5,398,988
[45] Date of Patent: Mar. 21, 1995

[54] VEHICLE DOOR ASSEMBLY

[75] Inventors: Delbert D. DeRees, Romeo; David J. Kowall, Hartland; Kanaiyalal C. Mehta, Rochester Hills, all of Mich.

[73] Assignee: Chrysler Corporation, Highland Park, Mich.

[21] Appl. No.: 155,507

[22] Filed: Nov. 22, 1993

[51] Int. Cl.[6] .......................... B60J 5/06; E05D 15/10
[52] U.S. Cl. ........................................ 296/155; 49/213; 49/217; 49/252; 49/130
[58] Field of Search ................ 49/252, 260, 213, 217, 49/130; 296/155, 202

[56] References Cited
U.S. PATENT DOCUMENTS

| | | | |
|---|---|---|---|
| 3,075,803 | 1/1963 | Wilfert | 296/46 |
| 4,025,104 | 5/1977 | Grosbach | 296/155 |
| 4,530,184 | 7/1984 | Chikaraishi et al. | 49/213 |
| 4,561,690 | 12/1985 | Shinjo et al. | 49/217 X |
| 4,615,558 | 10/1986 | Nakamura et al. | 296/155 X |
| 4,930,836 | 6/1990 | Grinn | 296/146 |

*Primary Examiner*—Philip C. Kannan
*Attorney, Agent, or Firm*—Edward P. Barthel

[57] ABSTRACT

A vehicle door assembly including front and rear doors which are latched together, and wherein the usual center pillar is integral with the front door. The rear door can be unlatched from the front door and the rear pillar and opened independent of the front door. Rollers on the rear door slide in a bottom track to roll the door along side the rear of the vehicle.

8 Claims, 4 Drawing Sheets

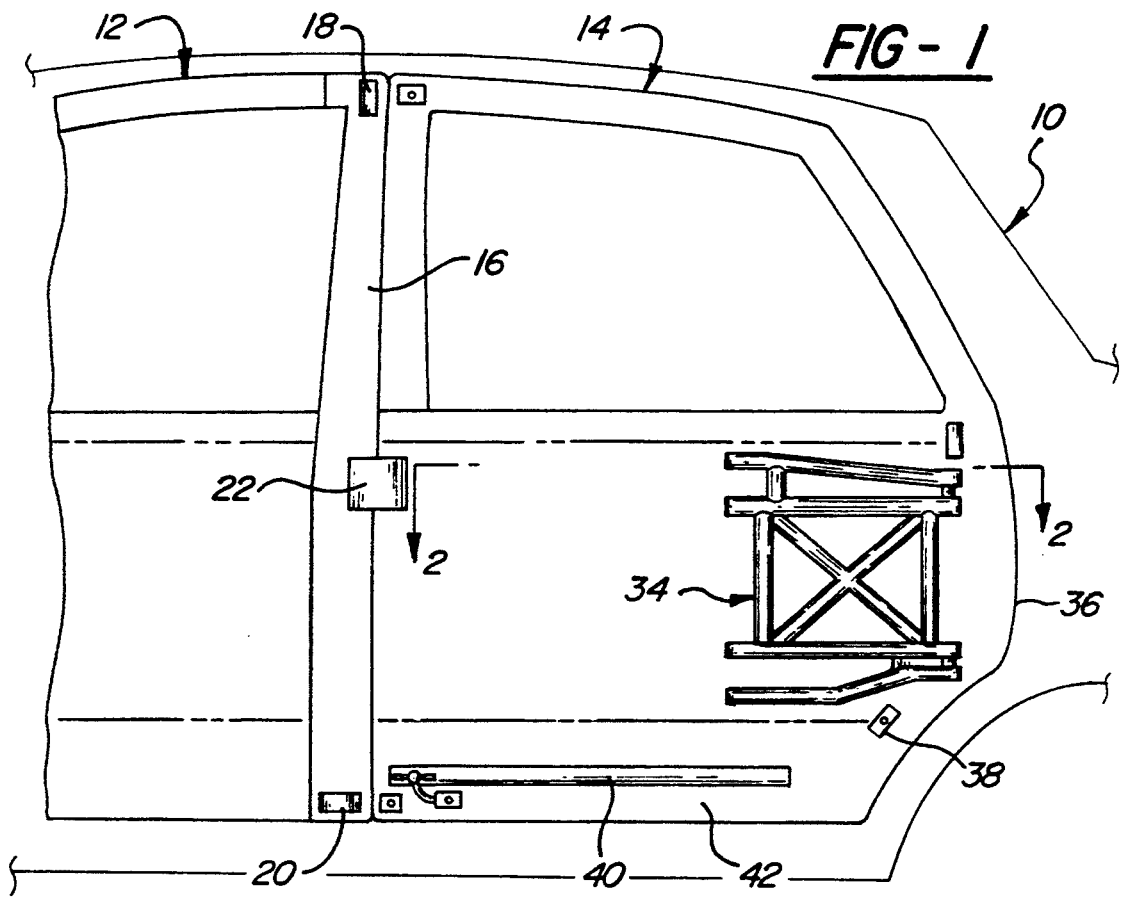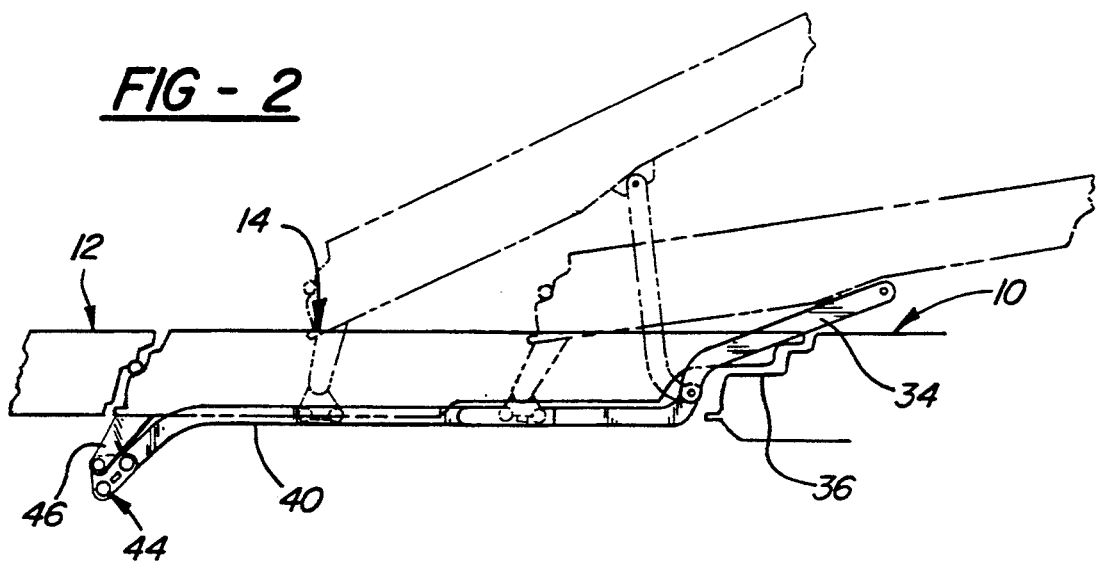

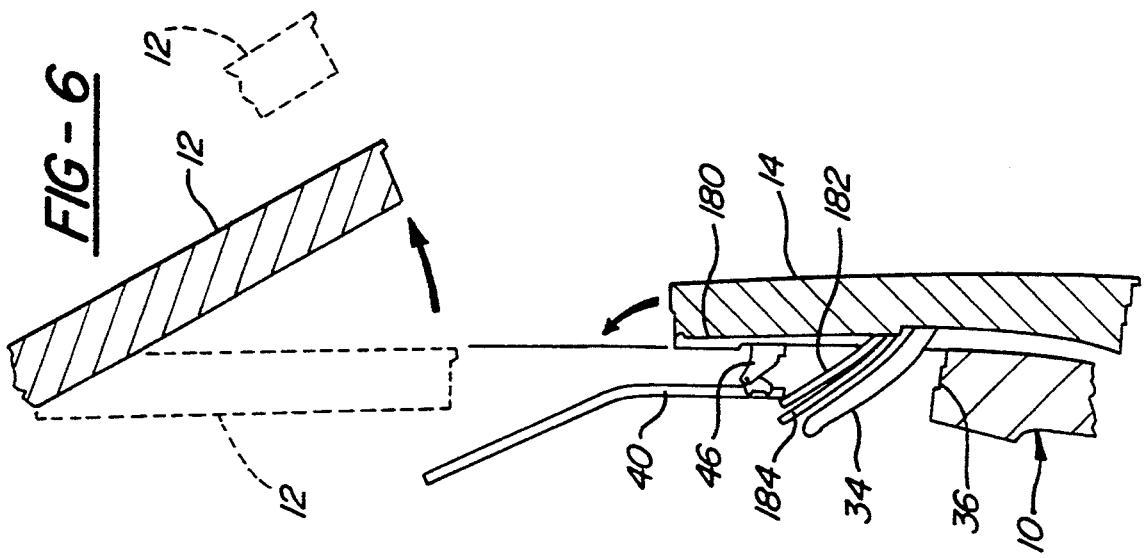
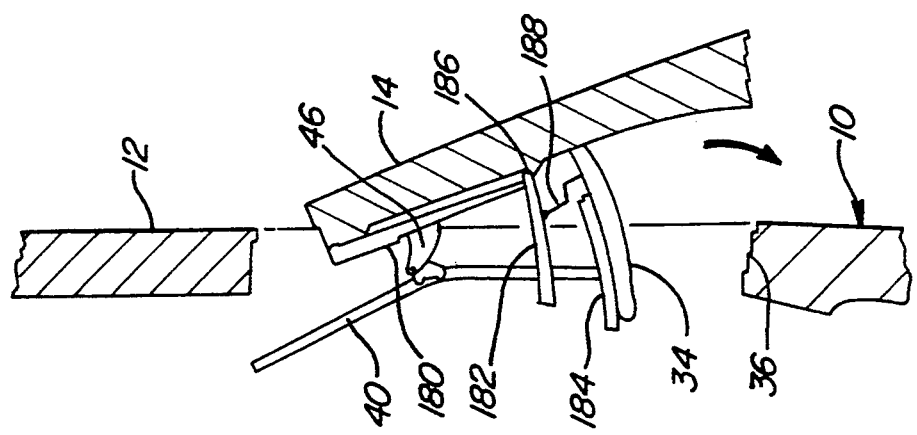
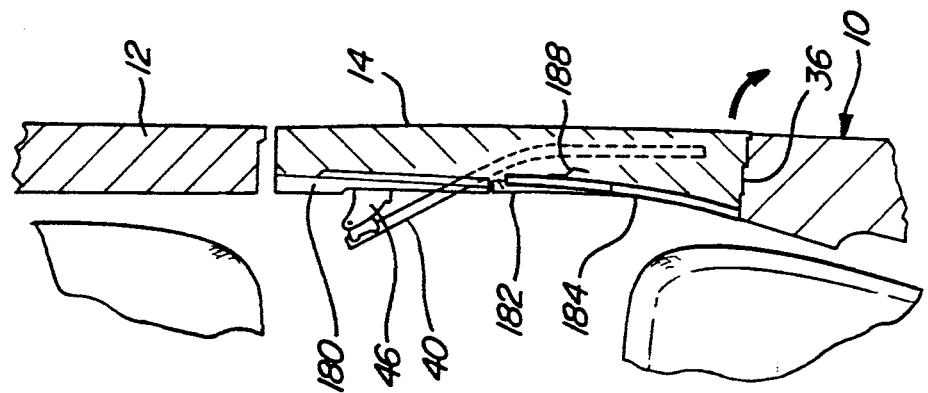

VEHICLE DOOR ASSEMBLY

TECHNICAL FIELD

This invention relates generally to vehicle door assemblies and, more particularly, to a door assembly wherein the center post is integral with the front door and the rear door can be opened independent of the front door.

BACKGROUND ART

A known door assembly, especially for pick-up trucks, consisting of a conventional front door and a rear auxiliary door latchingly secured together, is disclosed in Grinn U.S. Pat. No. 4,930,836. The rear door is latched to the truck body and is overlapped by the front door in their closed positions requiring sequential opening.

DISCLOSURE OF THE INVENTION

A general object of the invention is to provide an improved vehicle door assembly wherein the front and rear doors are latched together.

Another object of the invention is to provide a vehicle door assembly wherein the front and rear doors are latched together, and where the rear door can be opened while the front door remains closed, and vice versa.

A further object of the invention is to provide a door assembly wherein the rear door is adapted to open via a combined concurrent action of swinging about a hinge arm and sliding along a bottom track arrangement.

These and other object and advantages will become more apparent when reference is made to the following drawings and the accompanying description.

BRIEF DESCRIPTION OF THE DRAWINGS

FIG. 1 is a fragmentary diagrammatic sketch of a vehicle body assembly embodying the invention;

FIG. 2 is a cross-sectional view taken along the plane of the line 2—2 of FIG. 1, and looking in the direction of the arrows;

FIGS. 4, 5 and 6 are top views of the inventive door assembly illustrating three operational positions of the rear interior trim panels.

BEST MODE OF CARRYING OUT THE INVENTION

Figure 3A:
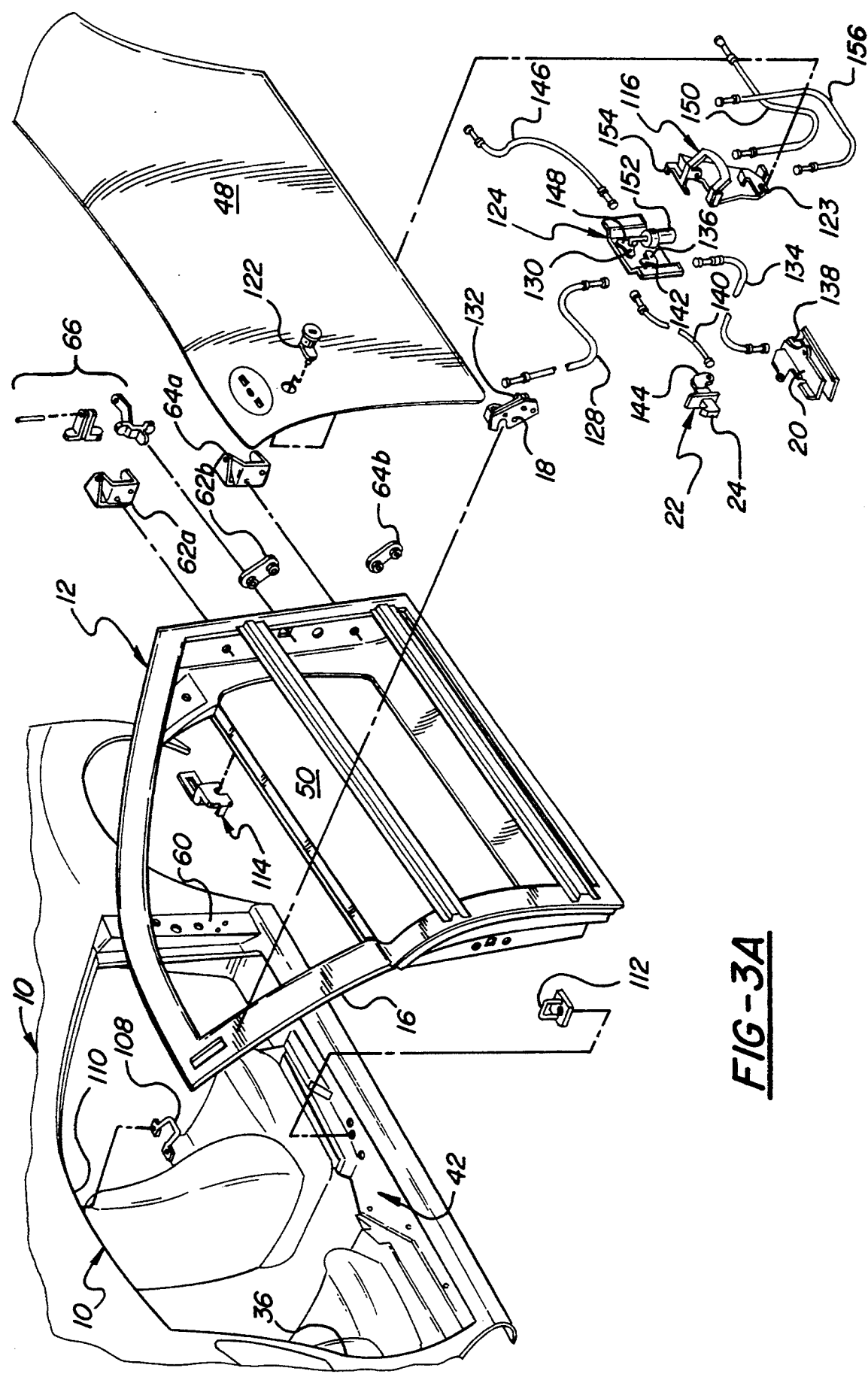
FIGS. 3A and 3B are exploded perspective views of the inventive vehicle door assembly.

Referring now to the drawings in greater detail, FIG. 1 illustrates generally a vehicle, represented as 10, having front and rear side doors 12 and 14, respectively. A center pillar 16 is formed integrally along the rear edge of the front door 12, with upper and lower latches 18 and 20, respectively, secured to the respective upper and lower end portions of the pillar 16.

Figure 3B:
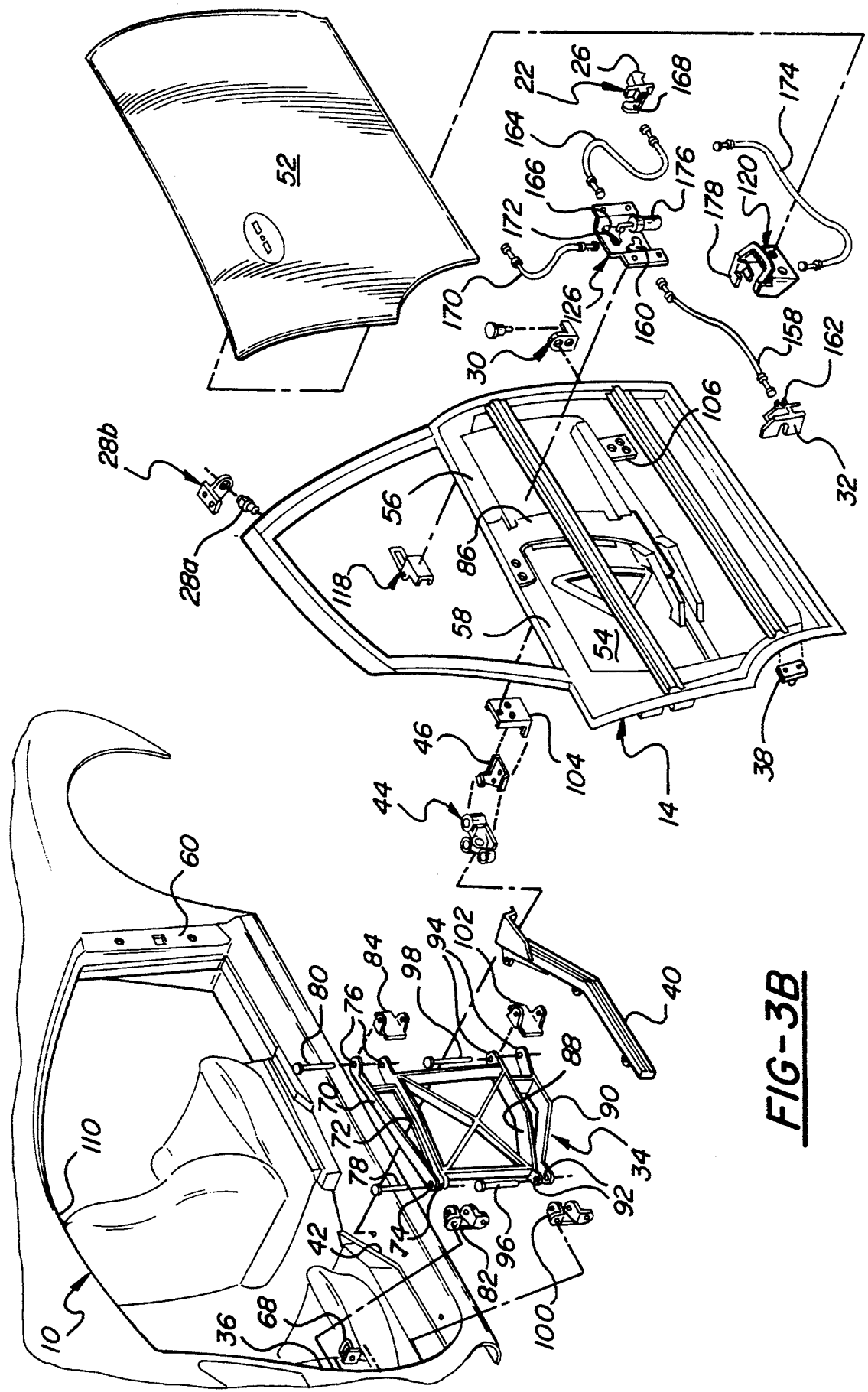

As shown in FIG. 3A, a dual action latch 22 includes a front component 24 secured to the pillar 16 at the belt line thereof and a rear component 26 shown in FIG. 3B, secured to the front edge of the rear door 14 for operational connection to the front component 24.

Upper and lower interlock and guide mechanisms 28a and 30, respectively, are mounted at the respective upper and lower front edge portions of the rear door 14; cooperating mechanism is located on the vehicle 10 body.

A latch 32 is secured to the rear edge of the rear door 14 at the belt line thereof. A bifurcated hinge arm 34 is pivotally connected between a mid portion of the rear door 14 and a rear pillar 36 of the vehicle 10 just below the belt line of the rear door. An interlock mechanism 38 is mounted at a lower rear edge portion of the rear door 14, as shown in FIGS. 1 and 3B.

A roller track 40 (FIGS. 2 and 3B) is mounted along the sill 42 of the vehicle 10 adjacent the bottom edge of the rear door 14. A roller assembly 44 is rollingly connected at one end of a linkage member 46 whose other end is pivotally connected to the front bottom edge portion of the rear door 14 for operational connection to the roller track 40.

As will be further explained, the rear door 14 is adapted to being unlatched from the pillars 16 and 36 and manually pulled rearwardly alongside the vehicle 10, with the roller assembly 44 rolling along the track 40 while the hinge arm 34 pivots rearwardly with the door 14 about the pillar 36. Such opening of the rear door 14 is accomplished independent of whether the front door 12 is closed or opened.

When both the front door 12 and rear door 14 are opened, since the center pillar 16 is integral with the front door 12, the side of the vehicle 10 is fully opened without any obstructions therein, facilitating the ingress and egress of passengers and/or the loading and unloading of bulky cargo.

Referring now more specifically to FIG. 3A, the front door 12 includes outer and inner door panels 48 and 50, respectively, and the rear door 14 includes outer and inner door panels 52 and 54, respectively. The rear inner panel 54 is divided into forward and rearward segments 56 and 58, respectively, for purpose to be explained.

The front door 12 is pivotally secured to a front pillar 60 by the usual upper and lower hinge assemblies 62a and 64a, and their associated anchor plates 62b and 64b, respectively, in conjunction with the usual opening check assembly 66.

The rear door latch 32 operatively connects to and disconnects from a striker 68 mounted on the rear pillar 36. The hinge arm 34 includes double interconnected upper braces 70 and 72 with two rear holes 74 and two front holes 76 therethrough for connection by suitable pivot pins 78 and 80, respectively, to an upper rear bracket 82 secured to the rear pillar 36, and to an upper front bracket 84 secured to the top portion of a vertical I-shaped brace 86 secured in the mid portion of the rear door 14. The hinge arm 34 further includes double interconnected lower braces 88 and 90 with two rear holes 92 and two front holes 94 therethrough for connection by suitable pivot pins 96 and 98, respectively, to a lower rear bracket 100 secured to the rear pillar 36, and to a lower front bracket 102 secured to a bottom portion of the I-shaped brace 86.

The linkage member 46 is connected to an angle bracket 104 secured to a fixed plate 106 in the rear door 14.

The upper latch 18 operatively connects to and disconnects from an upper striker 108 secured to the vehicle frame 110, and the lower latch 20 operatively connects to and disconnects from a lower striker 112 secured to the sill 42.

The front door 12 has inside and outside handle assemblies 114 and 116, respectively. The rear door 14 has inside and outside handle assemblies 118 and 120, respectively. The front door 12 further includes a key cylinder 122 operative to pivot a lever 123 pivotally mounted on the outer door handle 116, serving to allow the inside and outside handle assemblies to unlatch the various latches only when the front door is unlocked.

In operation, it is imperative that all the latches on either door unlatch at the same time, that is, the three latches 18, 20 and 24 of the front door 12, or the two latches 32 and 26 of the rear door 14. To accomplish this, front and rear control panel assemblies 124 and 126, respectively, are utilized, in conjunction with suitable cables, as will now be explained.

Referring first to the front control panel assembly 124, a first cable 128 is connected between a pivotable arm 130 on the control panel 124 and a pivotable member 132 on the upper latch 18. A second cable 134 is connected between a pivotable arm 136 on the control panel 124 and a pivotable member 138 on the lower latch 20. A third cable 140 is connected between a pivotable arm 142 on the control panel 124 and a pivotable member 144 on the center latch 24. A fourth cable 146 is connected between a pivotable arm 148 on the control panel 124 and the pivotable handle of the inside handle assembly 114. A fifth cable 150 is connected between a pivotable link 152 on the control panel 124 and a pivotable member 154 on the outside handle assembly 116. A sixth cable 156 is connected between the pivotable link 152 on the control panel 124 and the pivotable key cylinder lever 123 on the handle assembly 116.

Referring next to the rear control panel 126, a first cable 158 is connected between a pivotable arm 160 on the control panel 126 and a pivotable member 162 on the rear latch 32. A second cable 164 is connected between a pivotable arm 166 on the control panel 126 and a pivotable member 168 on the center latch 26. A third cable 170 is connected between a pivotable arm 172 on the control panel 126 and a pivotable handle of the inside handle assembly 118. A fourth cable 174 is connected between a pivotable link 176 on the control panel 126 and a pivotable extension 178 on the outside handle assembly 120.

As shown in FIGS. 4–6, the rear door 14 is covered with three respective front, center and rear trim panel segments 180, 182 and 184. The front trim segment 180 is fixedly attached to the door 14 forward of the hinge arm 34. As shown in FIG. 5, the center trim segment 182 is pivotally secured by a hinge 186 to the door 14 at its front vertical edge adjacent the rear vertical edge of the front segment 180. A link 188 is pivotally connected at its ends to an inner portion of the center segment 182 and to the inner end portion of the hinge arm 34. The rear trim segment 184 is mounted on the hinge arm 34.

As shown in FIGS. 5 and 6, when the rear door 14 starts to open outwardly and rearwardly with the roller assembly 44 rolling along the track 40, the hinge arm 34 concurrently starts to pivot outwardly. This causes the link 188 (FIG. 5) to urge the center segment 182 to start to pivot about the hinge 186 toward the front. Once the door 14 has swung and slid to a fully open position (FIG. 6), the rear trim segment 184 abuts against the center trim segment 182 at a predetermined angle with respect to the front trim segment 180.

By virtue of the above described arrangement, manual actuation of any one of the inside or outside rear handles, serves to unlatch the dual action latch and the rear latch, permitting the rear door to be hinged outwardly and rolled rearwardly along side the rear portion of the vehicle, as explained above.

Manual actuation of the inside or outside front handles serves to unlatch the dual action latch, if opened first, and the front upper and lower latches, permitting the front door to be pivoted open.

With both doors open there is no center post obstruction, facilitating the ingress and egress of passengers and/or the loading and unloading of bulky cargo.

INDUSTRIAL APPLICABILITY

It should be apparent that the invention provides an improved vehicle door assembly wherein the front and rear doors are latched together, and when both are opened there is an unobstructed full side opening.

It should be apparent that the invention provides a latched-together door assembly wherein the rear door can be opened while the front door remains closed or vice versa.

It should also be apparent that, by virtue of the lower track arrangement for the rear door, rather than the usual upper track, the vehicle may be more freely styled, i.e., the design is not limited to a substantially straight roofline, as is generally required to accommodate an upper track for sliding door guide systems.

It should be further apparent that this design does not require the usual center, exterior track along the side of the body aft of the rear door opening, thus enabling a more freely designed vehicle outer surface.

While but one embodiment of the invention has been shown and described, other modifications are possible within the scope of the following claims.

What is claimed is:

1. A door assembly for a vehicle including front and rear doors, inside and outside handles on each door, and a center post formed integrally within the front door, the improvement comprising a dual action latch mounted on the rear door and operatively connected to the inside and outside rear handles and to the front door, for opening one door while the other door remains closed upon manual actuation of any one of the respective inside and outside front and rear handles.

2. The improvement described in claim 1, and a track mounted on the vehicle, roller means mounted on the rear door and operatively connected to the track, a hinge arm operatively connected between the rear door and the vehicle, and additional latch means on the rear door operatively connected to the inside and outside rear handles and to the vehicle for opening the rear door to a position along side the vehicle by a combined rolling of the roller means along the track and pivoting of the door about the hinge arm upon manual actuation of either the inside or the outside rear handles.

3. A door assembly for a vehicle including front and rear doors, front and rear pillars, a bottom sill structure, inside and outside handles on each door, a key cylinder in the front door, wherein the front door is hinged to the front pillar, and a center pillar formed as an integral part of the rear end portion of the front door, the improvement comprising first latch means operative between adjacent edges of the front and rear doors, second latch means operative between the rear edge of the rear door and the rear pillar, a track mounted along the sill structure beneath the rear door, roller means mounted on the rear door for rolling cooperation with the track, and hinge means pivotally connected between the rear pillar and the rear door, wherein the rear door may be rolled to a position along side the vehicle as a result of the combined concurrent swinging and sliding action of the respective hinge means and roller means upon release of said first and second latch means by moving either one of the rear inside and outside handles.

4. The improvement described in claim 3, and third latch means operative between the front door and the vehicle adapted to being unlatched, along with the first latch means, by moving either one of the front inside and outside handles, to swing outwardly about the front pillar.

5. The improvement described in claim 4, and a control panel and a plurality of cables connected between the control panel and each of the first and third latch means and between the control panel and each of inside and outside front handles.

6. The improvement described in claim 3, and a control panel and a plurality of cables connected between the control panel and each of the first and second latch means and between the control panel and each of the inside and outside rear handles.

7. The improvement described in claim 3, and front, center and rear interior trim panel segments operatively mounted on the rear door.

8. The improvement described in claim 7, wherein said front segment is fixedly secured to a forward portion of the rear door, said center segment is pivotally secured at its forward edge to the rear door, a link is operatively connected between the center segment and said hinge means, and said third segment is mounted on said hinge means.

* * * * *